(12) United States Patent
Eggensperger et al.

(10) Patent No.: US 11,904,766 B2
(45) Date of Patent: Feb. 20, 2024

(54) LIGHT SIGNAL DEVICE FOR A DRIVERLESS TRANSPORT SYSTEM

(71) Applicant: W. Gessmann GmbH, Leingarten (DE)

(72) Inventors: Martin Eggensperger, Heilbronn (DE); Andrew Herzig, Nordheim (DE); Jonas Bachmann, Heilbronn (DE); Alexander Cristea, Heilbronn (DE); Matthias Gschelak, Stetten (DE)

(73) Assignee: W. Gessmann GmbH, Leingarten (DE)

( * ) Notice: Subject to any disclaimer, the term of this patent is extended or adjusted under 35 U.S.C. 154(b) by 100 days.

(21) Appl. No.: 17/657,923

(22) Filed: Apr. 4, 2022

(65) Prior Publication Data
US 2022/0219601 A1    Jul. 14, 2022

Related U.S. Application Data

(63) Continuation of application No. PCT/EP2020/078103, filed on Oct. 7, 2020.

(30) Foreign Application Priority Data

Oct. 7, 2019    (DE) .................... 10 2019 215 332.1

(51) Int. Cl.
*B60Q 1/00*    (2006.01)
*B60Q 1/50*    (2006.01)
*F21V 8/00*    (2006.01)

(52) U.S. Cl.
CPC ............ *B60Q 1/525* (2013.01); *B60Q 1/507* (2022.05); *B60Q 1/5037* (2022.05); *B60Q 1/543* (2022.05);
(Continued)

(58) Field of Classification Search
CPC ....... B60Q 1/525; B60Q 1/5037; B60Q 1/507; B60Q 1/543; B60Q 2400/20;
(Continued)

(56) References Cited

U.S. PATENT DOCUMENTS 9,103,956 B2 * 8/2015 Nichol ................. G02B 6/0013
10,470,274 B2   11/2019 Masuda et al.
(Continued)

FOREIGN PATENT DOCUMENTS

CN    202 831 939 U    3/2013
CN    104718107 A      6/2015
(Continued)

*Primary Examiner* — Van T Trieu
(74) *Attorney, Agent, or Firm* — Orbit IP

(57) ABSTRACT

A light signal device for a driverless transport system, includes a front element having a plurality of optically transparent light exit openings and at least one light generating unit having a light guide and having two light sources arranged at opposite ends of the light guide. The light guide has a plurality of light decoupling elements in order to emit light through the light exit openings. Light exit openings are arranged on the front element in a plurality of rows and a separate light generating unit is provided for each of the rows. A light signal arrangement for a driverless transport system includes a plurality of such light signal devices. A driverless transport system includes the light signal device and a controller. Use of the light signal device is for visualizing an operating state of a driverless transport system. An operating method for the light signal device is also disclosed.

21 Claims, 6 Drawing Sheets

(52) U.S. Cl.
CPC ......... *G02B 6/0068* (2013.01); *G02B 6/0073* (2013.01); *G02B 6/0078* (2013.01); *B60Q 2400/20* (2013.01); *B60Q 2900/40* (2022.05)

(58) Field of Classification Search
CPC ...... B60Q 2900/40; B60Q 1/50; B60Q 1/503; G02B 6/0068; G02B 6/0073; G02B 6/0078; G02B 6/005; G02B 6/001; F21S 43/237; F21S 43/245; F21S 43/249; F21S 43/14; F21V 2200/00; F21W 2103/00; F21Y 2115/10
See application file for complete search history.

(56) References Cited

U.S. PATENT DOCUMENTS

| | | | |
|---|---|---|---|
| 10,752,162 B2 | 8/2020 | Gutjahr et al. | |
| 2005/0134447 A1* | 6/2005 | Su | B60Q 1/44 340/463 |
| 2012/0127399 A1* | 5/2012 | Shiraishi | G02B 6/0055 349/65 |
| 2013/0314942 A1* | 11/2013 | Nichol | G02B 6/0028 362/603 |
| 2015/0274071 A1 | 10/2015 | Gocke | |
| 2015/0367295 A1* | 12/2015 | Okumura | F04B 35/04 99/323.1 |
| 2016/0077272 A1* | 3/2016 | Lu | G02B 6/0065 362/625 |
| 2018/0010759 A1* | 1/2018 | Schoemer | B60Q 1/2607 |
| 2018/0017226 A1 | 1/2018 | Valois et al. | |
| 2018/0312106 A1 | 11/2018 | Tatara et al. | |
| 2019/0248421 A1 | 8/2019 | Jacobsthal et al. | |
| 2020/0328050 A1* | 10/2020 | Files | G06F 3/0219 |

FOREIGN PATENT DOCUMENTS

| | | |
|---|---|---|
| CN | 108025670 A | 5/2018 |
| CN | 108349428 A | 7/2018 |
| CN | 108473082 A | 8/2018 |
| CN | 109424930 A | 3/2019 |
| DE | 41 29 094 A1 | 3/1993 |
| DE | 100 2016 225 385 A1 | 6/2018 |
| EP | 3 034 752 A1 | 6/2016 |
| EP | 3 273 149 A1 | 1/2018 |
| EP | 3 450 253 A1 | 3/2019 |
| JP | 2013 037963 A | 2/2013 |
| WO | 2012/095831 A1 | 7/2012 |
| WO | 2018/065871 A1 | 4/2018 |

* cited by examiner

LIGHT SIGNAL DEVICE FOR A DRIVERLESS TRANSPORT SYSTEM

CROSS-REFERENCE TO RELATED APPLICATIONS

This continuation application claims priority to PCT/EP2020/078103 filed on Oct. 7, 2020 which has published as WO 2021/069485 A1 and also the German application number 10 2019 215 332.1 filed on Oct. 7, 2019, the entire contents of which are fully incorporated herein with these references.

DESCRIPTION

Field of the Invention

The invention relates to a light signal device for a driverless transport system, to a light signal arrangement for a driverless transport system and to a driverless transport system. The invention also relates to the use of a light signal device and to an operating method for a driverless transport system.

Background of the Invention

Driverless transport systems are widely used to transport loads in manufacturing and logistics.

It is known to illuminate driverless transport systems by means of LED strips arranged around the periphery or by means of LED matrices. In practice, this has often required many LEDs with a correspondingly high-power consumption, which is disadvantageous with regard to the limited battery capacity of the driverless transport system. Static illumination often takes place with constant illumination brightness and color, by means of which substantially only the position or contour of the driverless transport system can be highlighted.

US 2012/0280528 A1 describes a light strip for an outer surface of a vehicle with a light guide into which light from LEDs is coupled at several points. A rear face of the light guide is treated such that light is reflected out to the front face of the light guide. The light strip has a one-way mirror on the front, which can be masked in regions so that, for example, illuminated letters appear.

DE 10 2012 211 052 A1 discloses motor vehicle interior lighting with a plurality of light sources and a plurality of light guides, the light sources and light guides being designed and arranged relative to one another in such a way that light from different light sources is coupled into different light guides. The light guides each have a plurality of decoupling regions spaced apart in the main light propagation direction. The light guides can be arranged so as to extend one next to the other. The light guides can be held on a substantially transparent diffuser. At the location of a recess in a vehicle door interior lining, the diffuser can have a diffusion plate or a printed foil by means of which the light guided through the diffuser and coupled out at the recess is homogenized.

SUMMARY OF THE INVENTION

Object of the Invention

It is the object of the invention to improve the perceptibility of driverless transport systems.

Description of the Invention

This object is achieved according to the invention by a light signal device, a light signal arrangement, a driverless transport system, a use and an operating method taught herein.

Light Signal Device According to the Invention:

According to the invention, a light signal device is provided for a driverless transport system. The light signal device is used to optically highlight the driverless transport system, in particular an operating state of the driverless transport system. As a result, the actions of the driverless transport system can be better assessed by people, for example production workers. This can help to increase acceptance of driverless transport systems and prevent accidents.

The light signal device comprises a front element having a plurality of optically transparent light exit openings. Light can exit through the light exit openings during operation of the light signal device. Apart from the light exit openings, the front element is fundamentally opaque, i.e., not translucent. In other words, the light exit openings are designed as optically transparent regions in the otherwise opaque front element. The light exit openings can be formed as physical openings, i.e., through-holes in the front element. The front element can preferably have a (physically) closed surface, the front element being partially transparent (to form the light exit openings) and (otherwise) opaque. Overall, the front element can have a flat, in particular smooth, surface. Alternatively, the light exit openings can be recessed or raised on the surface of the front element. By means of the distribution, size, arrangement and/or design of the light exit openings on the front element, the optical effect of the light signal device during operation can be designed in a way that is suitable for the relevant application. When the light signal device does not emit any light, the light exit openings are typically not visible to the naked eye. The front element can be black, at least on its visible surface. This can contribute to the improved visibility of lighting effects and to concealing the light exit openings in the non-backlit state.

The light signal device also has at least one light generating unit. The light generating unit comprises a light guide and two light sources arranged at opposite ends of the light guide. The light sources are used to introduce light into the light guide at the ends thereof. In particular, the light sources can be designed and arranged for introducing light in end faces of the light guide. The light guide can consist of PMMA (polymethyl methacrylate). The light guide is typically elongate. A length of the light guide between the two light sources can be at least five times, typically at least 10 times, preferably at least 20 times, as great as a width or height of the light guide measured perpendicularly to the longitudinal extension.

The light guide has a plurality of light decoupling elements in order to emit light through the light exit openings. The light decoupling elements make it possible to direct the light from the two light sources to the plurality of light exit openings and to emit it through the plurality of light exit openings. The light decoupling elements can be introduced into the light guide by mechanical processing, for example milling, or by printing, for example pad, digital or screen printing. A processed or printed part of the light guide typically forms a light decoupling element. The front element can act as a diffuser medium for light decoupled from the light guides.

Typically, light is supplied to a plurality of light exit openings by a single light decoupling element of the light guide. The light guide can have light decoupling elements that are not assigned to any light exit openings. This can make it possible to use structurally identical light guides with different front elements, where different light decoupling elements interact with light exit openings depending on the particular front element.

The light guide can extend in a straight line. The light exit openings are typically arranged so as to extend parallel to the light guide. A straight light signal device of this kind can advantageously be used to highlight the longitudinal or transverse contours of a driverless transport system.

The light exit openings are advantageously arranged on the front element in a plurality of rows. This allows another dimension to be added to the light signal device. This allows further refined optical effects for highlighting the driverless transport system. A separate light generating unit is provided for each of the rows. In this way, the rows can be actuated or illuminated independently of one another. Each of the rows can have a plurality of light exit openings in height direction. In other words, the light exit openings can be arranged closer together within one of the rows than between two adjacent rows.

The light sources are preferably in the form of LEDs, in particular RGB LEDs. Light-emitting diodes have a particularly low energy consumption. By means of RGB LEDs (typically each comprising a green, a red and a blue LED element), any light colors can be emitted by suitable actuation. In particular, RGB LEDs allow the light color to be adapted to an operating state of the driverless transport system that is to be highlighted, for example braking, driving forward or a change of direction. Advantageously, RGB LEDs can be formed as RGBW LEDs with an additional white LED element, or more preferably as RGBWW LEDs for emitting white light of different color temperatures, in particular by mixing warm white and cool white light (typically obtainable from a warm white and a cool white LED element of RGBWW-LED).

A plurality of the light exit openings may form a common light spot. In particular, a plurality of light spots can each be formed by a plurality of the light exit openings. The visibility of the illumination can be further improved by light spots enlarged in this way. The shape and size of the light spot can be defined in a suitable manner by the positioning of the light exit openings. The light spots can be, for example, round, oval, rectangular, linear, triangular and/or arrow-shaped. One light decoupling element is typically assigned to exactly one light spot. The light exit openings forming one light spot are typically arranged so close together that they cannot be distinguished from one another with the naked eye (in particular, in the illuminated state).

Alternatively, the light exit openings may be designed and arranged in the front element for virtually continuous emission of light. This can give the impression of uniform illumination of the front element.

The light decoupling elements are particularly preferably designed and/or arranged for homogeneous light emission over the length of the light guide. As a result, the attenuation of the light fed into the light guide by the light sources can be counteracted in the light guide as the distance from the particular light source increases. In order to achieve this, the size, type and/or distribution of the light decoupling elements can be suitably selected.

Light Signal Arrangement According to the Invention:

A light signal arrangement for a driverless transport system comprising a plurality, preferably four or eight, of light signal devices according to the invention as described above also falls within the scope of the present invention.

Additional optical effects can be achieved by the plurality of light signal arrangements. In particular, different sides or edges of the driverless transport system can each be highlighted by means of a light signal device of the light signal arrangement.

The light signal devices can form a preferably rectangular frame. The frame can be arranged around the periphery of the driverless transport system. Two or more light signal devices are preferably arranged in succession along one side of the frame. This allows the two portions of the side to be illuminated independently of one another using the relevant light signal device. In addition, this can improve the uniformity of illumination along the side of the frame.

The light signal arrangement can also have a display, in particular a matrix display. The display can be used to display symbols and/or characters. Additional information can be shown by means of the display. Information shown by means of the display can be aimed directly at a viewer of the driverless transport system comprising the light signal arrangement.

Driverless Transport System According to the Invention:

A driverless transport system comprising a light signal device according to the invention as described above also falls within the scope of the present invention. The driverless transport system preferably comprises a light signal arrangement according to the invention as described above having a plurality of light signal devices according to the invention as described above. The driverless transport system also comprises a controller for actuating the light signal device or the light signal arrangement depending on an operating state of the driverless transport system. The driverless transport system is thus able to visualize its operating state by means of the light signal device or light signal arrangement.

The light signal device or the light signal arrangement (preferably all the light signal devices of the light signal arrangement) can be oriented for an, in particular directed, emission of light obliquely upward. This can advantageously allow the light signal device or light signal arrangement to be arranged for emitting light toward the eyes of a viewer (who is in a typical position relative to the driverless transport system, for example standing a few meters next to the driverless transport system). In particular, the front element of the light signal device(s) can enclose an angle of between 30° and 75°, preferably between 50° and 70°, with the horizontal.

In principle, the driverless transport system has a power drive for automatically moving the driverless transport system and a load-bearing device for carrying loads (cargo) to be transported. The controller can also be designed to actuate the power drive.

The control unit is preferably set up to carry out an operating method according to the invention described below.

The light signal device or the light signal arrangement is preferably arranged adjacent to the load-bearing device of the driverless transport system. This allows the optical highlighting of the load-bearing device or a load (cargo) that is being handled. The load-bearing device is typically arranged at the top of the driverless transport system.

The controller can be set up to visualize a movement (planned and/or already being in execution) of the driverless transport system by means of the light signal device or the light signal arrangement. This can make it possible for a viewer to foresee a movement of the driverless transport system before this movement is (completely) executed. In particular, it can be provided that light effects, preferably green-colored brightness maxima, propagate in the direction of travel when driving forward or backward along side edges of the driverless transport system. Braking can be indicated by an illumination, in particular, in red, on a rear side of the driverless transport system. A change of direction can be indicated by light effects propagating in the direction of the new direction of travel, in particular by orange-colored brightness maxima, on the rear side and/or a front side of the driverless transport system.

The controller is preferably set up to provide information regarding a loading state of the driverless transport system by means of the light signal device or the light signal arrangement. The information can relate, for example, to maintaining or exceeding a permissible load. Alternatively or additionally, the information can relate to the positioning, in particular a shifting, of a load on the driverless transport system. This can make the operation of the driverless transport system safer.

It is possible for the controller to be set up to indicate an imminent collision of the driverless transport system with an obstacle by means of the light signal device or the light signal arrangement. In particular, a person located in the planned route of the driverless transport system can be informed by suitable light signals that they are blocking this route. A person can also be informed by suitable light signals that an object is located as an obstacle in the planned route, so that said person can remove the object. The controller is particularly preferably set up to stop the driverless transport system before it collides with the obstacle.

Use According to the Invention of a Light Signal Device:

The scope of the present invention also includes the use of a light signal device according to the invention as described above, in particular a light signal arrangement according to the invention as described above having a plurality of light signal devices, for visualizing an operating state of a driverless transport system. The light signal device or the light signal arrangement is typically an on-board light signal device or light signal arrangement of the driverless transport system. The driverless transport system can be a driverless transport system according to the invention as described above. The operating state can describe a movement state of the driverless transport system, for example a driving speed and/or a driving direction and/or a change in either of these. Alternatively or additionally, the operating state can describe a loading state, for example with regard to maintaining a permissible loading and/or a position of a load (cargo). Furthermore, the operating state can describe a charging process and/or a state of charge of a battery of the driverless transport system.

Operating Method According to the Invention:

Finally, the scope of the present invention includes an operating method for a light signal device according to the invention as described above, in particular for a driverless transport system according to the invention as described above comprising a light signal device. In the operating method, simultaneously, a luminous flux emitted by one light source of the light generating unit is reduced and a luminous flux emitted by the other light source of the light generating unit is increased, so that a brightness maximum, migrating along the front element, of emitted light is generated. This operating method advantageously allows an operating state of the driverless transport system, in particular a movement state or a change therein, to be visualized. If a plurality of light-generating units arranged one above the other in rows are provided, additional effects can be generated by a time offset in the actuation of the light sources of the light generating units of the different rows. In particular, the optical impression of an arrow (moving in the direction of travel, for example) can be generated by slightly earlier actuation of the light sources of the central light-generating unit(s).

Further features and advantages of the invention can be found in the description and the drawings. The aforementioned features and those which are to be explained below can each be used individually for themselves or for a plurality of expedient combinations of any kind. The embodiments shown and described are not to be understood as an exhaustive enumeration but rather have exemplary character for the description of the invention.

BRIEF DESCRIPTION OF THE DRAWINGS

The invention is represented in the drawings and is explained in more detail using embodiments. In which.

DETAILED DESCRIPTION OF THE PREFERRED EMBODIMENTS

Figure 1:
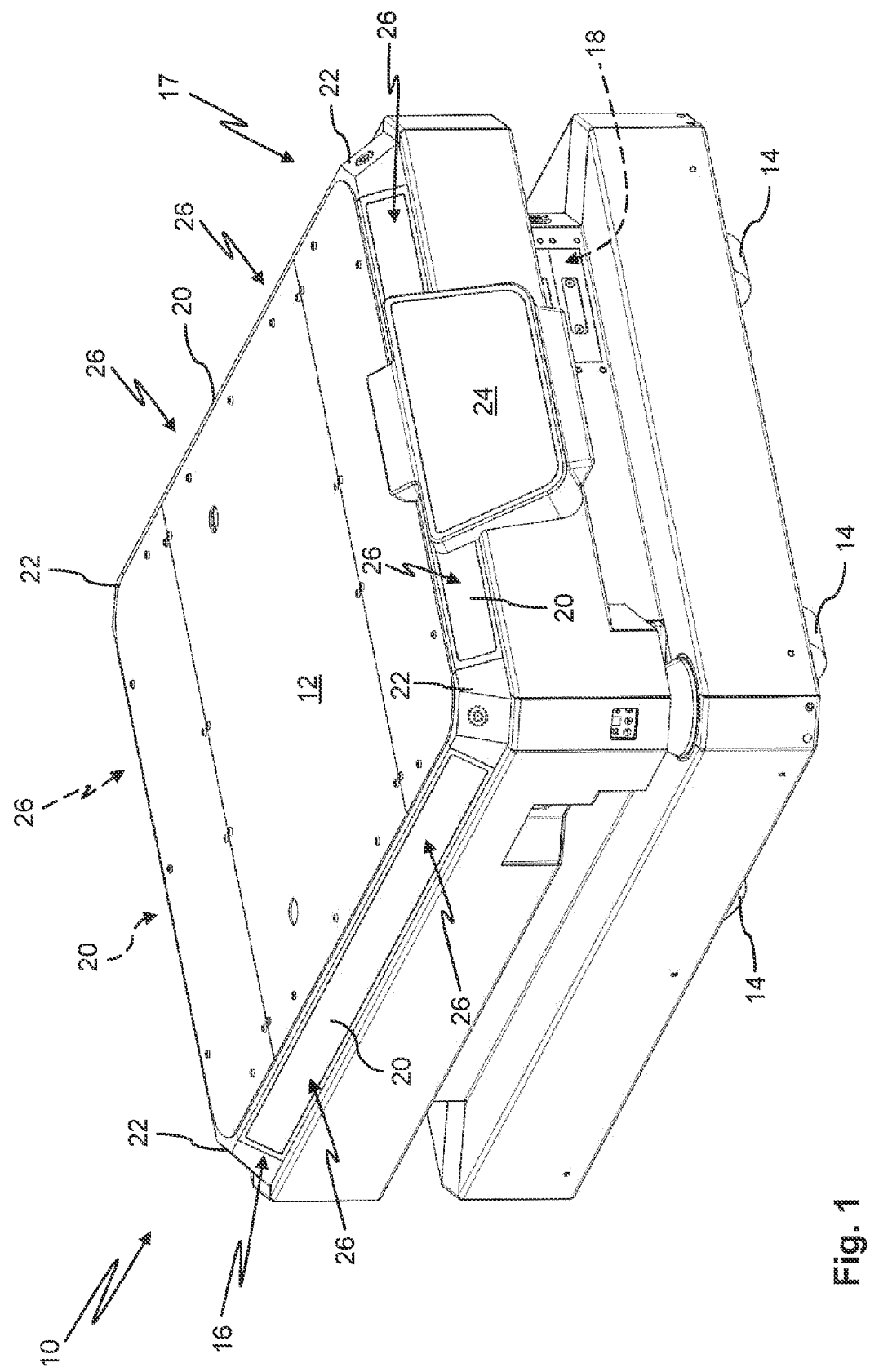
FIG. 1 is a schematic perspective view of a driverless transport system according to the invention comprising a light signal arrangement according to the invention having a plurality of light signal devices according to the invention.

FIG. 1 shows a driverless transport system 10. The driverless transport system 10 has a load-bearing device 12 for carrying loads (not shown in more detail). The driverless transport system 10 also has a power drive (not shown in detail) with wheels 14. The driverless transport system 10 can move automatically by means of the power drive.

The driverless transport system 10 has a light signal arrangement 16. Here, the light signal arrangement 16 is designed in the form of a rectangular frame 17; see also FIG. 2. The light signal arrangement 16 can be provided directly adjacently to the load-bearing device 12 on the driverless transport system 10. Here, the light signal arrangement 16 surrounds the load-bearing device 12 over the entire periphery thereof.

The driverless transport system 10 has a controller 18. The controller 18 is used to actuate the light signal arrangement 16 depending on an operating state of the driverless transport system 10. Furthermore, the controller 18 can be set up to actuate the power drive, i.e., to automatically move the driverless transport system 10 by means of the wheels 14.

Figure 2:
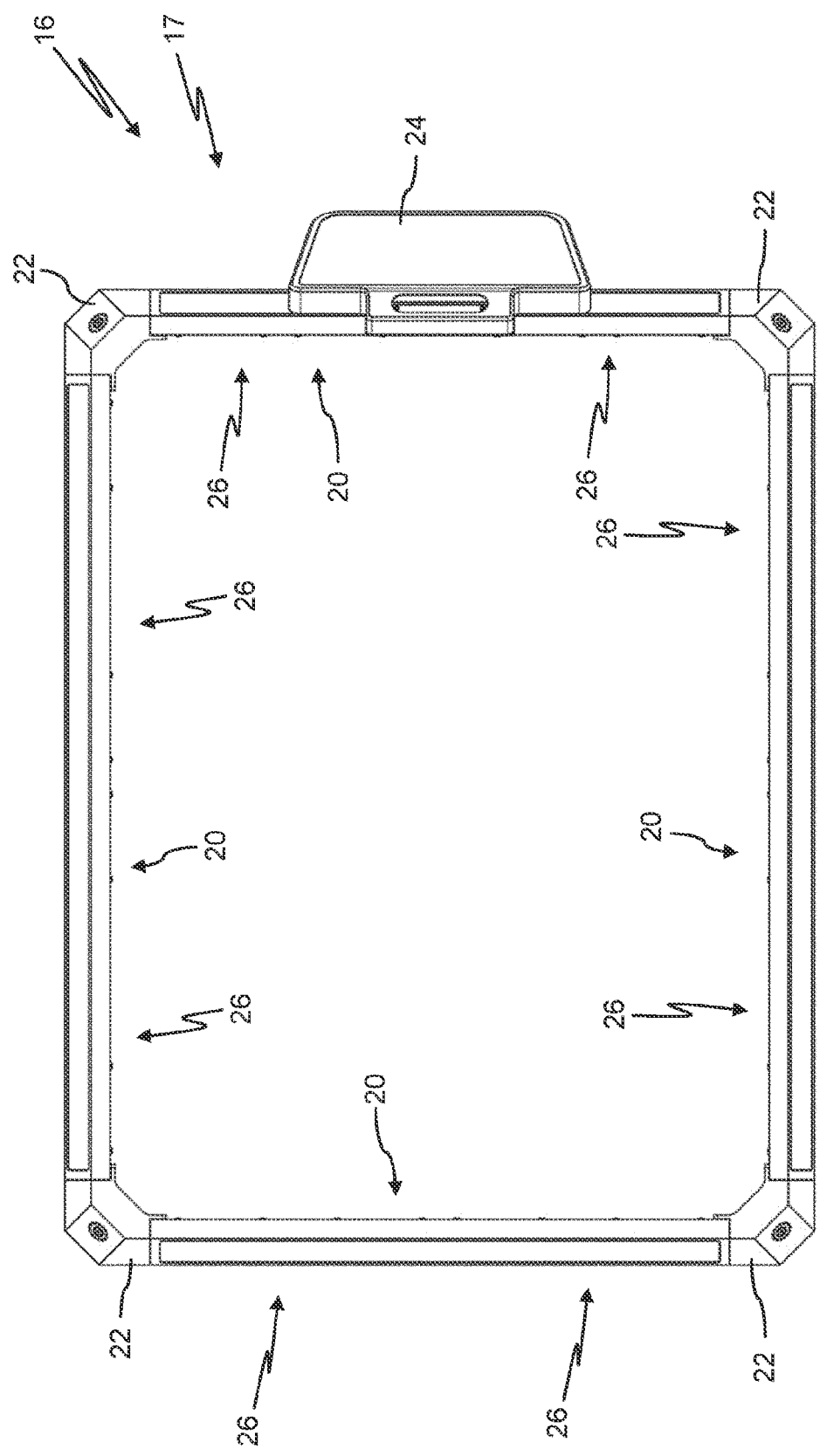
FIG. 2 is a schematic plan view of a light signal arrangement according to the invention having a plurality of light signal devices according to the invention, which form a rectangular frame, and having a matrix display.
Figure 3:
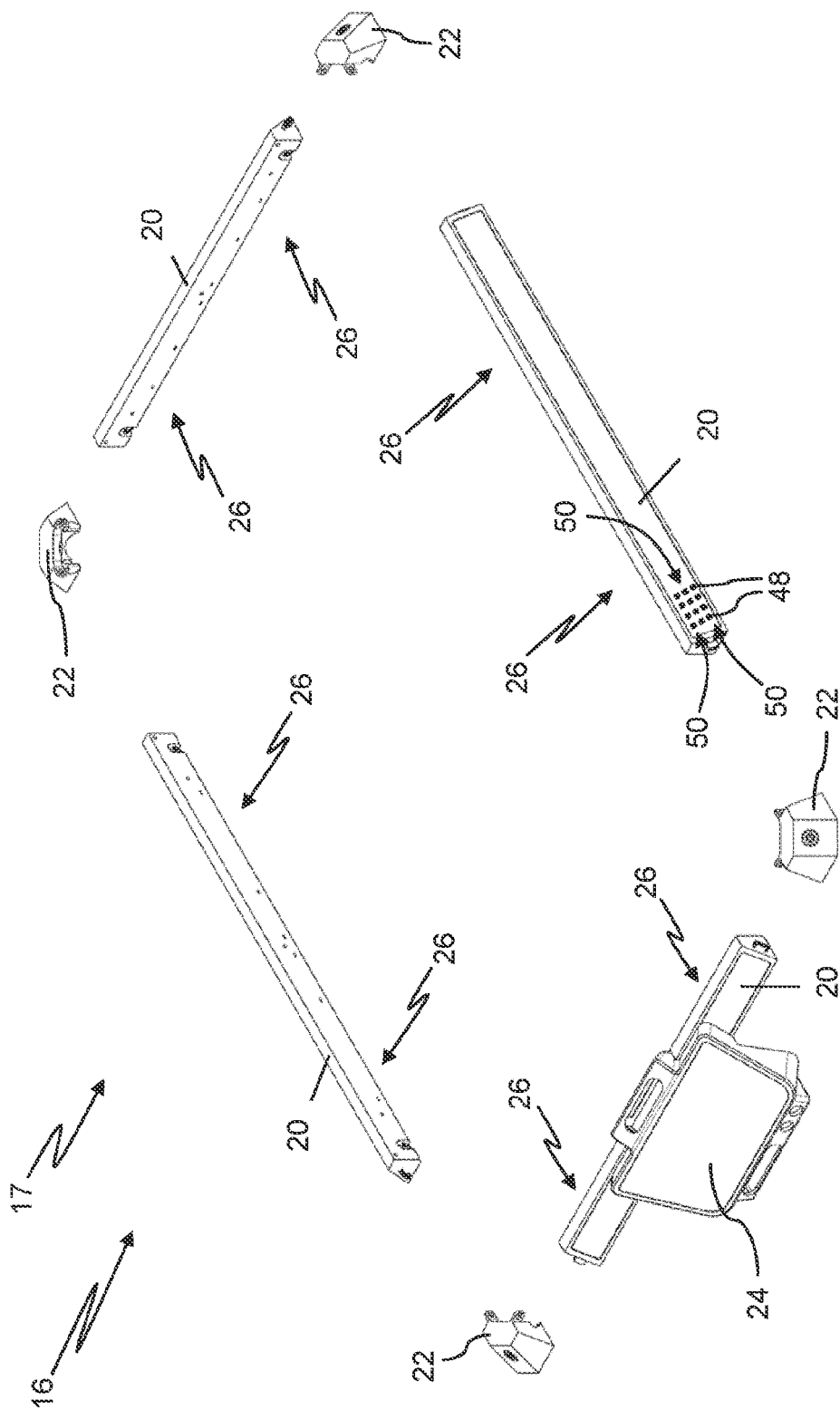
FIG. 3 is a schematic exploded view of the light signal arrangement of FIG. 2.

FIG. 2 shows the light signal arrangement 16 of the driverless transport system 10 from FIG. 1 in isolation. FIG. 3 shows the light signal arrangement 16 in an exploded view. Here, the light signal arrangement 16 comprises four side elements 20, four corner connectors 22 and a display 24. The display 24 is designed as a matrix display in this case. The display 24 can be used, in particular, to display symbols and/or characters. The display 24 can be arranged on one of the side elements 20, preferably in the middle. The display 24 can be a TFT display. The display 24 can have additional LEDs on the side. The LEDs on the side can be used, for example in the form of information or warning lights, to display predefined states. The display 24 in the middle can be used, for example, to simulate a mimic expression of the driverless transport system 10 and/or to display more detailed status information (e.g., relating to a load of the driverless transport system 10).

Figure 4:
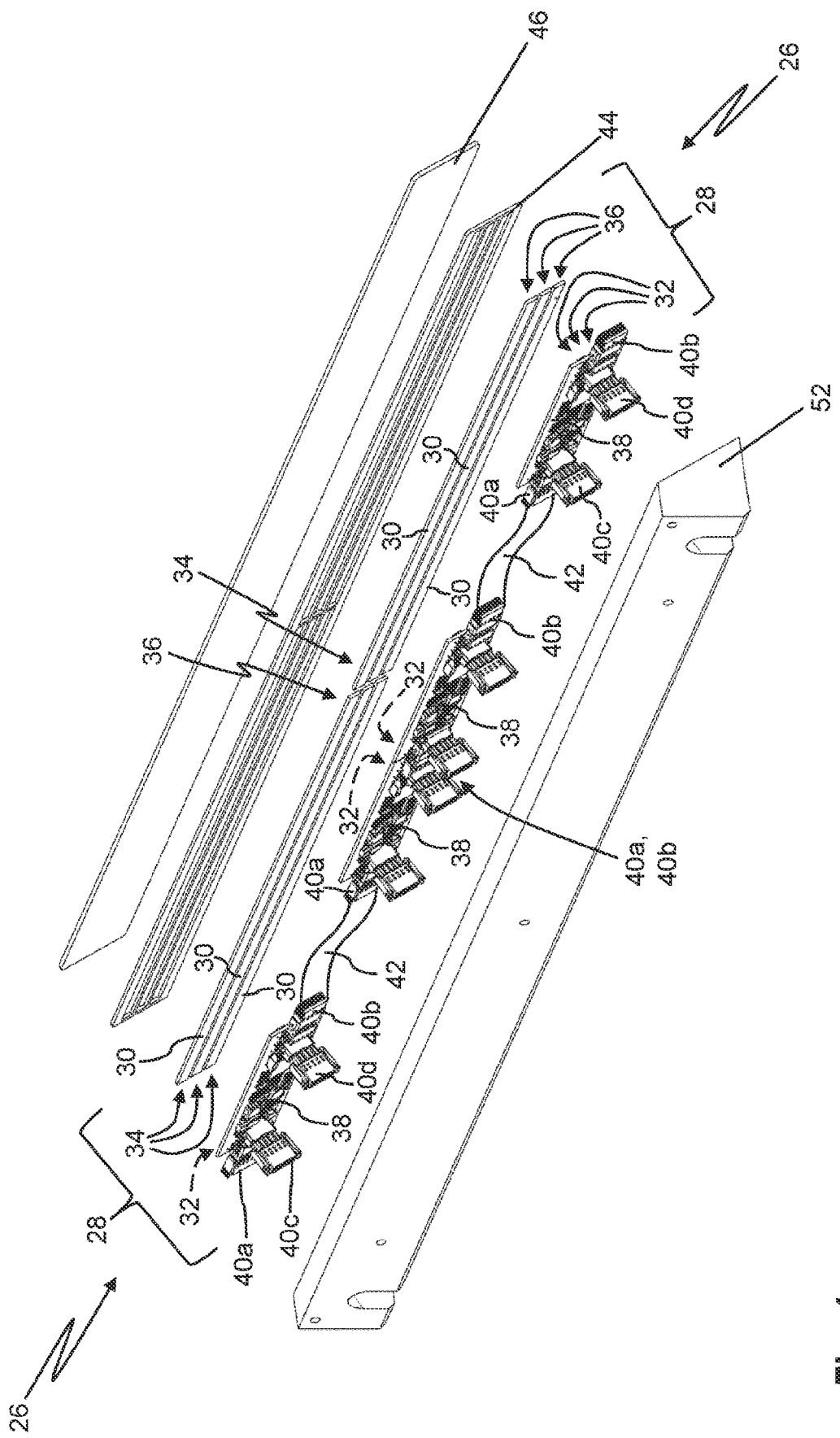
FIG. 4 is a schematic exploded view of two light signal devices according to the invention arranged in succession.

FIG. 4 shows a side element 20 in a schematic exploded view. Here, each of the side elements 20 has two light signal devices 26. The two light signal devices 26 in one of the side elements 20 are arranged in succession in the longitudinal direction of the particular side element 20.

The light signal devices 26 each have a plurality of light generating units 28. Here, each light signal device 26 comprises three light-generating units 28 arranged one above the other in rows. Each of the light generating units 28 comprises an elongate light guide 30. Here, the light guides 30 are straight and extend parallel to one another. Each of the light generating units 28 also comprises two light sources 32 for each of the light guides 30. The light sources 32 can be designed as LEDs. Here, the light sources 32 are each designed as an RGB LED. The light sources 32 are each arranged at opposite ends 34, 36 of the light guides 30. The light sources 32 can be designed and arranged for introducing light into the light guides 30 at end faces thereof.

Here, the light sources 32 for one of the ends 34, 36 of the three light guides 30 of one of the light signal devices 26 are each arranged on a common circuit board 38. The circuit boards 38 can each have electronic components for actuating the light sources 32. Here, four plug-in contacts 40a, 40b, 40c, 40d are provided on each of the circuit boards 38 in order to supply the light sources 32 with electrical energy and control signals from the controller 18. In the embodiment shown, only the plug-in contacts 40a, 40b are used. The plug-in contacts 40c and 40d could be omitted. The plug-in contacts 40a and 40b of the two circuit boards 38 of one of the light signal devices 26 can be connected by means of a cable 42. The plug-in contacts 40a and 40b of the adjacent circuit boards 38 of the two light signal devices 26 of the side element 20 can be plugged directly into one another.

Here, the light guides 30 of the two light signal devices 26 of the side element 20 are held in a common light guide mount 44. Alternatively, a separate light guide mount (not shown) could also be provided for each of the light signal devices 26.

The light signal devices 26 have a front element 46. Here, a common front element 46 for the two light signal devices 26 of the side element 20 is provided. Alternatively, a separate front element (not shown) could also be provided for each of the light signal devices 26.

The front element 46 has a plurality of optically transparent light exit openings. Apart from the light exit openings, the front element 46 is opaque (not translucent). The light exit openings are not visible in the drawings due to their small size. A plurality of light exit openings can be grouped in such a way that they form a common light spot 48; cf. FIG. 3. Here, the light exit openings or the light spots 48 are arranged on the front element 46 in three rows 50 arranged one above the other. The rows 50 on the front element 46 correspond to the three light guides 30 of the light signal devices 26. In FIG. 3, four light spots 48 of each of the rows 50 are shown illuminated by way of example.

In order to be able to emit light from the light sources 32 through the light exit openings of the front element 46, the light guides 30 each have a plurality of light decoupling elements (not shown in detail). The light decoupling elements can each be obtained by mechanically changing the surfaces of the light guides 30 facing the front element 46. In particular, the surface of the light guides 30 can be mechanically processed to form the light decoupling elements, for example by milling. Alternatively, the light decoupling elements can be printed onto the light guides 30.

The light decoupling elements can be distributed over the length of the light guides 30 or formed differently over the length such that when light is introduced through one or both of the light sources 32 at the ends 34, 36, the light is emitted uniformly (homogeneously) toward the front element 46. As a result, the perceptible brightness of the light exiting through the light exit openings of the front element 46 is at least approximately constant over the length of the light signal device 26. The determination of a suitable design, in particular size, and/or distribution (arrangement) of the light decoupling elements can preferably be carried out by calculation, in particular by simulation, or experimentally.

Figure 5:
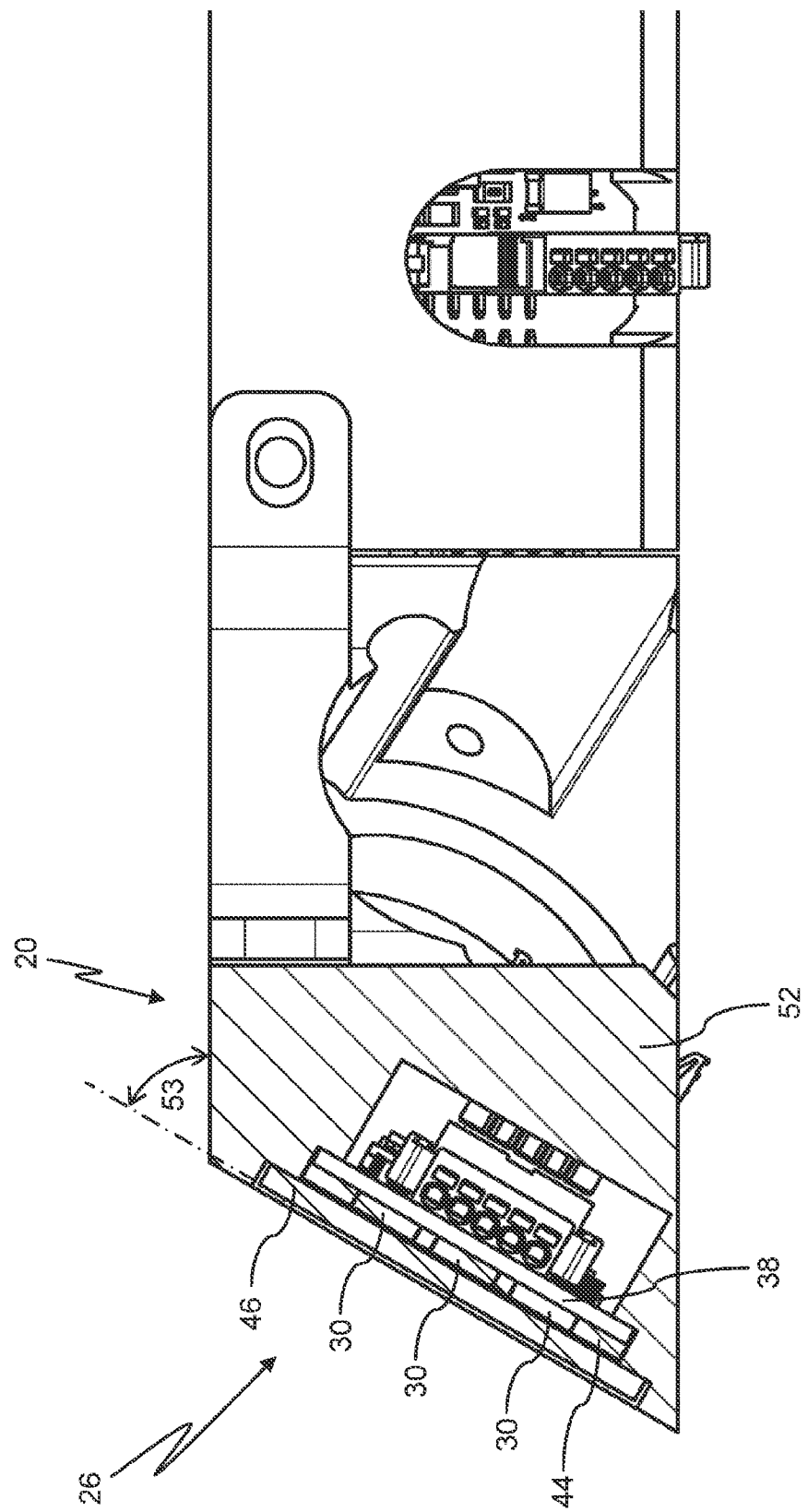
FIG. 5 is a schematic cross-sectional view of a light signal device according to the invention.

FIG. 5 shows a cross section through one of the light signal devices 26 according to FIG. 4 in the assembled state. The circuit board 38 and the light sources 32, the light guides 30, the light guide mount 44 and the front element 46 are accommodated in a main body 52 of the light signal device 26. Here, the main body 52 is designed to accommodate the two light signal devices 26 of the side element 20. Alternatively, a separate main body could be provided for each light signal device 26.

Here, the front element 46 encloses an angle 53 of 60° with the horizontal (the plane of movement of the driverless transport system 10; cf. FIG. 1). This results in directed emission of light obliquely upward through the light exit openings. In this way, the emitted light can be directed specifically into the eyes of a viewer standing at a typical distance of a few meters from the driverless transport system 10. The light signal devices 26 therefore appear particularly bright to the viewer.

Figure 6:
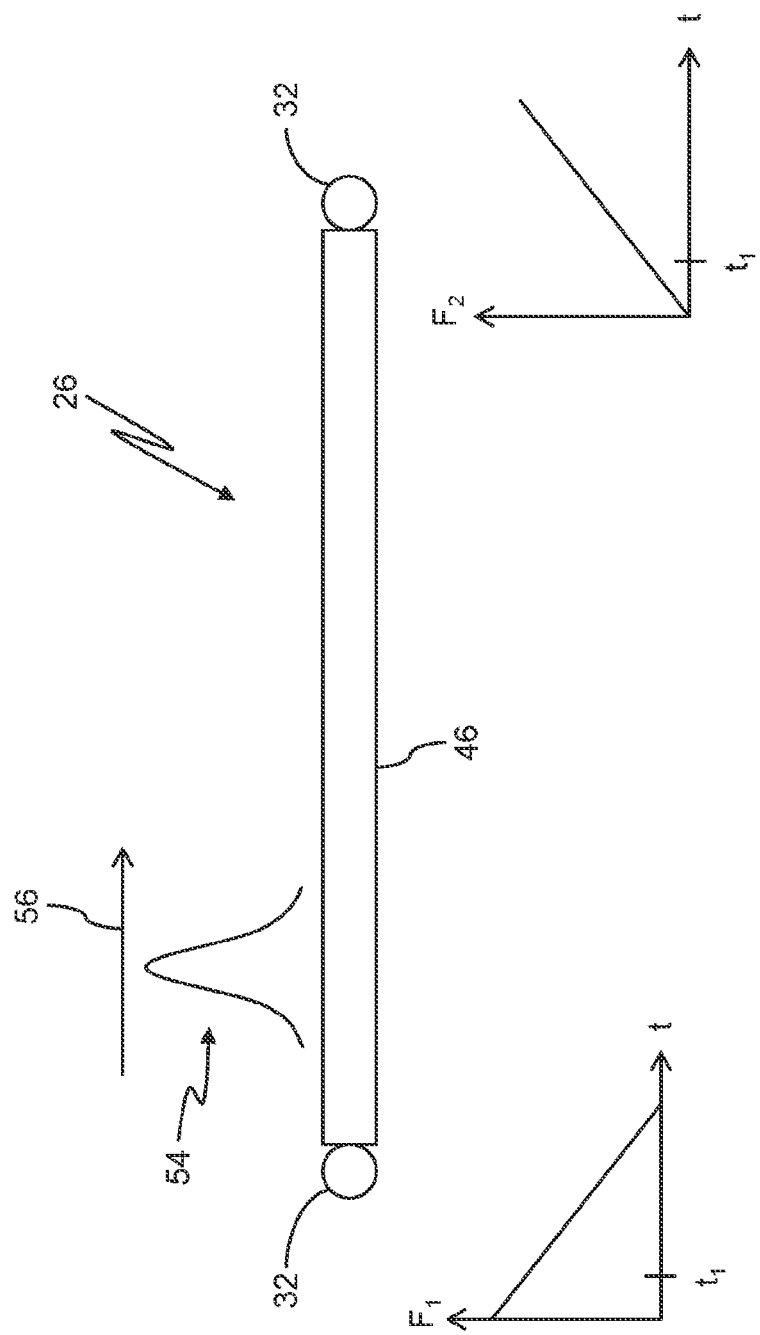
FIG. 6 is a schematic illustration of an operating method for a light signal arrangement for generating a moving brightness maximum.

FIG. 6 shows, in schematic form, an operating method for a light signal device 26. In the operating method, a luminous flux $F_1$ emitted by the one light source 32 on the left in FIG. 6 of the light signal device 26 is reduced over the time t. Simultaneously with the reduction in the luminous flux $F_1$, a luminous flux $F_2$ emitted by the second light source 32, on the right in FIG. 6, of the light signal device 26 is increased over the time t. The two luminous fluxes $F_1$ and $F_2$ are superimposed in the light guide (not shown in more detail) of the light signal device 26. As a result, a local brightness maximum 54 is emitted via the light exit openings of the front element 46. Due to the simultaneous dimming down and up of the first and second light sources 32, the brightness maximum 54 moves along the front element 46, here from left to right; cf. arrow direction 56. FIG. 6 shows the position of the brightness maximum 54 at a point in time $t_1$.

This operating method can be used, in particular, to display a movement, for example a direction of travel or a (planned) change in the direction of travel of a driverless transport system 10; cf. FIG. 1. The controller 18 can be set up to carry out the operating method.

The operating method for the driverless transport system 10 can also include that a loading state of the load-bearing device 12 is displayed by means of one or more of the light signal devices 26 and/or the display 24. Furthermore, the operating method for the driverless transport system 10 can include that an imminent collision of the driverless transport system 10 with an obstacle is indicated by means of one or more of the light signal devices 26 and/or the display 24. The controller 18 can be set up to correspondingly actuate the light signal devices 26 or the display 24.

LIST OF REFERENCE SIGNS

Driverless transport system 10
Load-bearing device 12
Wheels 14
Light signal arrangement 16
Frame 17
Controller 18
Side elements 20
Corner connector 22
Display 24
Light signal devices 26
Light generating unit 28
Light guide 30
Light sources 32
Opposite ends 34, 36
Circuit board 38
Plug-in contacts 40a, 40b, 40c, 40d
Cable 42
Light guide mount 44
Front element 46
Light spot 48
Rows 50
Main body 52
Angle 53
Luminous flux $F_1$, $F_2$
Time t
Point in time $t_1$
Brightness maximum 54
Arrow direction 56

What is claimed is:

1. A light signal device for a driverless transport system, comprising:
    a front element having a plurality of optically transparent light exit openings, the front element being opaque apart from the light exit openings; and
    at least one light generating unit having a light guide and having two light sources arranged at opposite ends of the light guide;
    wherein the light guide has a plurality of light decoupling elements in order to emit light through the light exit openings;
    wherein the light exit openings are arranged on the front element in a plurality of rows; and
    wherein a separate light generating unit is provided for each of the rows;
    wherein each of the rows has a plurality of light exit openings in a height direction, the light exit openings being arranged closer together within one of the rows than between two adjacent rows; and
    wherein light is supplied to a plurality of light exit openings by a single light decoupling element of the light guide.

2. The light signal device according to claim 1, wherein the light sources are in the form of LEDs.

3. The light signal device according to claim 1, wherein several of the light exit openings form a common light spot.

4. The light signal device according to claim 1, wherein the light decoupling elements are designed and/or arranged for homogeneous light emission over the length of the light guide.

5. A light signal arrangement comprising a plurality of the light signal devices according to claim 1 configured for a driverless transport system.

6. The light signal arrangement according to claim 5, wherein the light signal devices form a rectangular frame.

7. The light signal arrangement according to claim 6, wherein two light signal devices are arranged in succession along one side of the frame.

8. The light signal arrangement according to claim 5, further comprising a display, in particular a matrix display, for displaying symbols and/or characters.

9. The driverless transport system comprising the light signal device according to claim 1 or comprising the light signal arrangement according to claim 5, and comprising a controller for actuating the light signal device or the light signal arrangement depending on an operating state of the driverless transport system.

10. The driverless transport system according to claim 9, wherein the light signal device is oriented for a directed emission of light obliquely upward.

11. The driverless transport system to claim 9, wherein the light signal device is arranged adjacent to a load-bearing device of the driverless transport system and surrounds the load-bearing device.

12. The driverless transport system according to claim 9, wherein the controller is set up to visualize a movement of the driverless transport system by means of the light signal device.

13. The driverless transport system according to claim 9, wherein the controller is set up toprovide information regarding a load state of the driverless transport system by meaans of the light signal device.

14. The driverless transport system according to claim 9, wherein the controller is set up to indicate an imminent collision of the driverless transport system with an obstacle by means of the light signal device arrangement.

15. Use of the light signal device according to claim 1 or the light signal arrangement according to claim 5, for visualizing an operating state of the driverless transport system.

16. An operating method for the light signal device according to claim 1, wherein, simultaneously, a luminous flux emitted by one light source of the light generating unit is reduced and a luminous flux emitted by the other light source of the light generating unit is increased, so that a brightness maximum, migrating along the front element, of emitted light is generated.

17. The light signal device according to claim 1, wherein the light sources are in the form of RGB LEDs.

18. The light signal arrangement according to claim 5 configured for the driverless transport system, comprising a plurality, being at least four, of light signal devices.

19. The light signal arrangement according to claim 5 configured for the driverless transport system, comprising a plurality, being at least eight, of light signal devices.

20. The driverless transport system according to claim 9, wherein the light signal device is oriented for a directed emission of light obliquely upward, wherein the front element and a plane of movement of the driverless transport system enclose an angle between 30 ° and 75 °.

21. The driverless transport system according to claim 9, wherein the light signal device is oriented for a directed emission of light obliquely upward, wherein the front element and a plane of movement of the driverless transport system enclose an angle between 50 ° and 70 °.

* * * * *

UNITED STATES PATENT AND TRADEMARK OFFICE
CERTIFICATE OF CORRECTION

PATENT NO. : 11,904,766 B2
APPLICATION NO. : 17/657923
DATED : February 20, 2024
INVENTOR(S) : Martin Eggensperger et al.

It is certified that error appears in the above-identified patent and that said Letters Patent is hereby corrected as shown below:

In the Claims

Column 10, Claim 5, Line 2, "for a" should read --for the--.

Column 10, Claim 11, Line 20, "system to" should read --system according to--.

Column 10, Claim 13, Line 29, "toprovide" should read --to provide--.

Column 10, Claim 13, Line 31, "meaans" should read --means--.

Column 10, Claim 14, Line 35, "device arrangement" should read --arrangement--.

Column 10, Claim 20, Line 59, "30 °and 75 °." should read --30° and 75°.--.

Column 10, Claim 21, Line 64, "50 °and 70 °." should read --50° and 70°.--.

Signed and Sealed this
Ninth Day of April, 2024

Katherine Kelly Vidal
*Director of the United States Patent and Trademark Office*